Oct. 19, 1937.  B. J. PEPPER  2,096,261
INDICATOR FOR LIQUID DISPENSING APPARATUS
Filed July 3, 1933   6 Sheets-Sheet 1

Byron J. Pepper, INVENTOR.

BY

A. H. Burns, ATTORNEY.

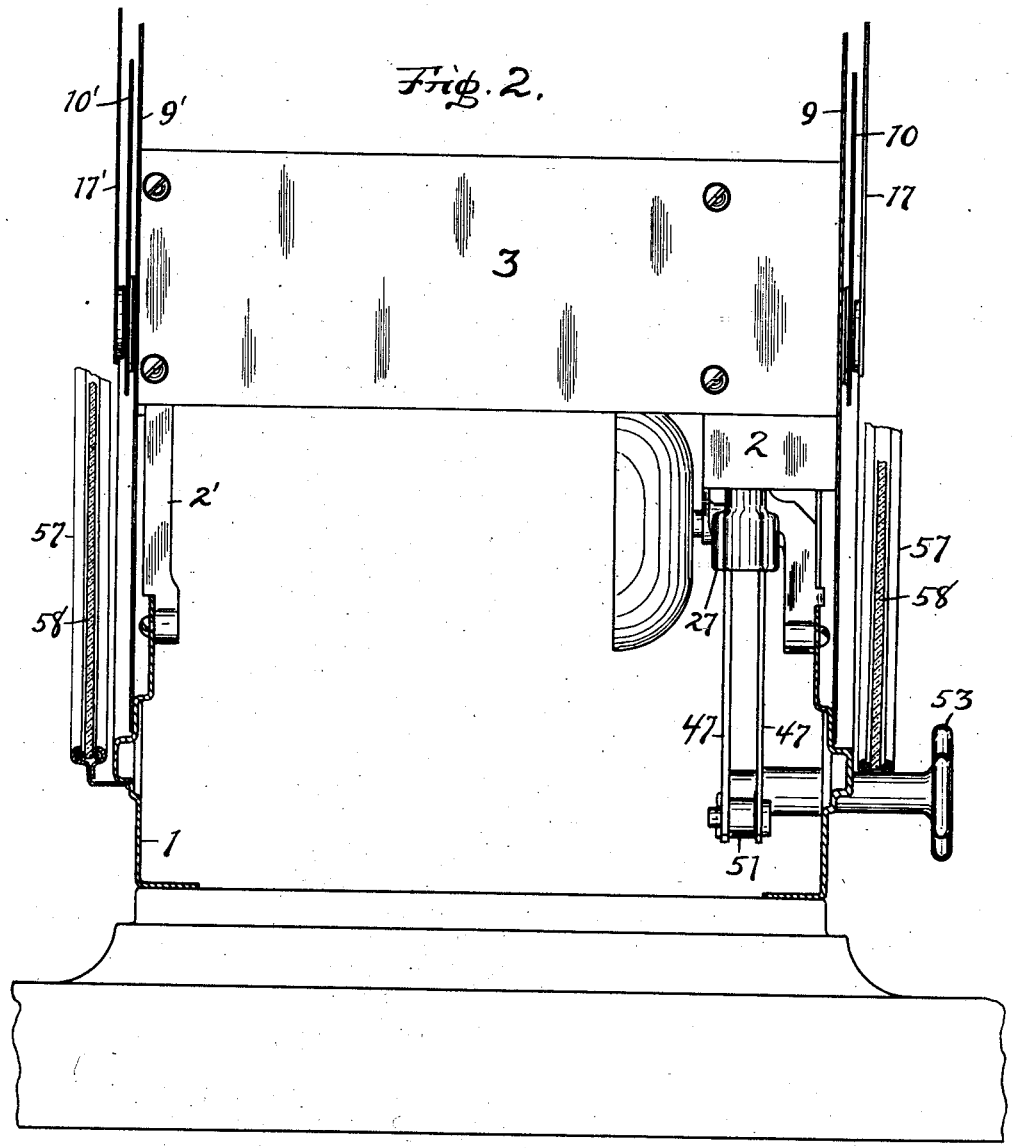

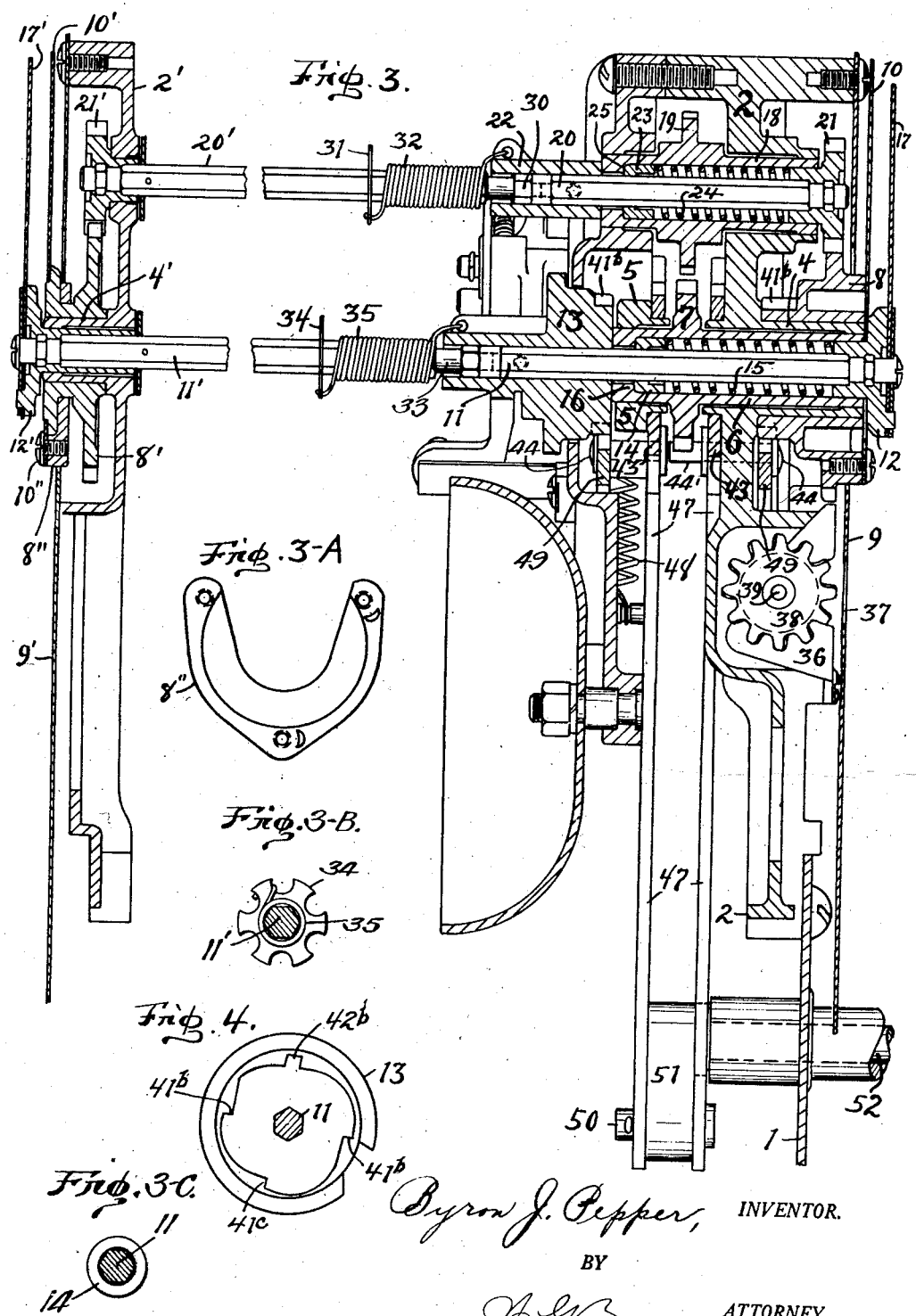

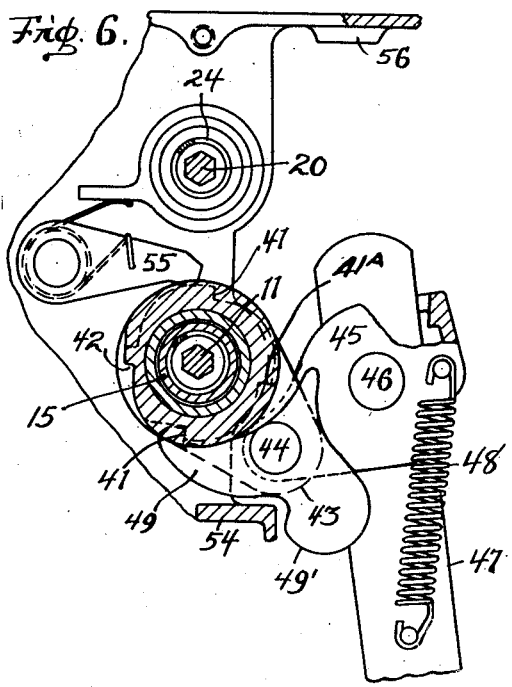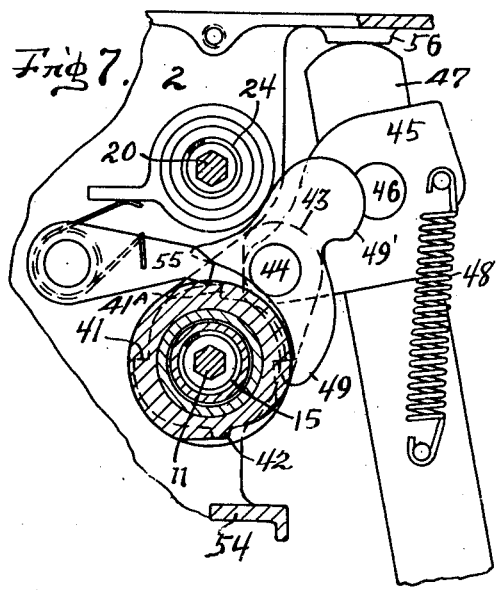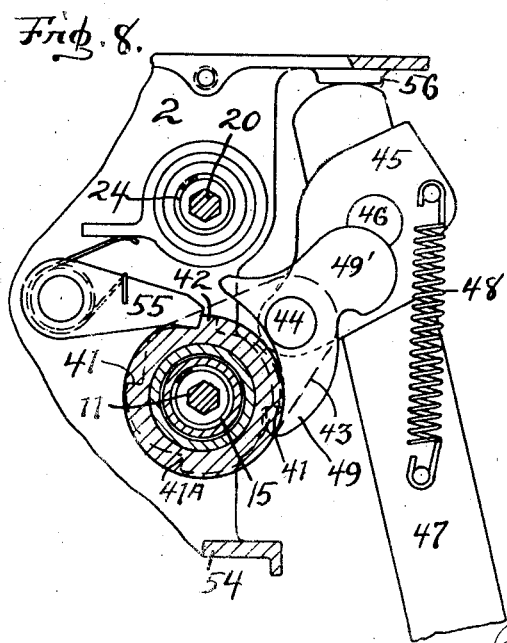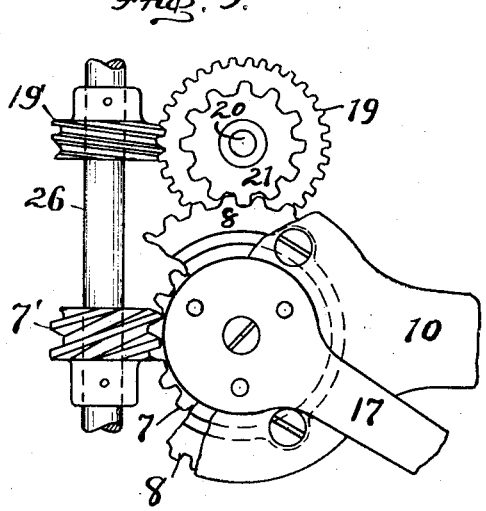

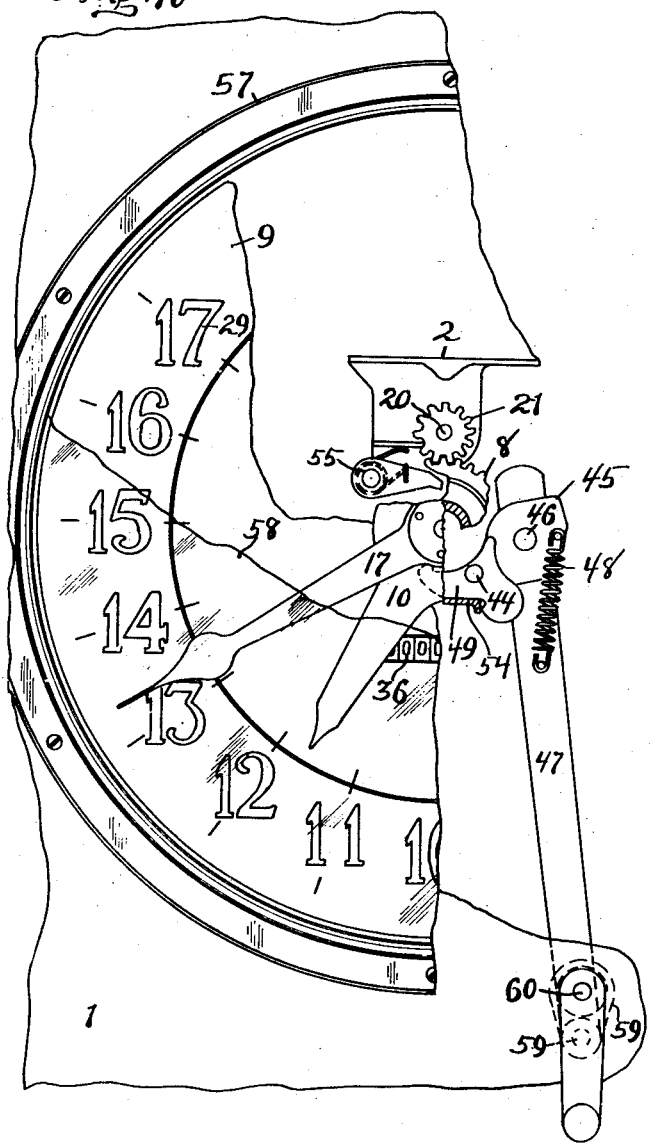
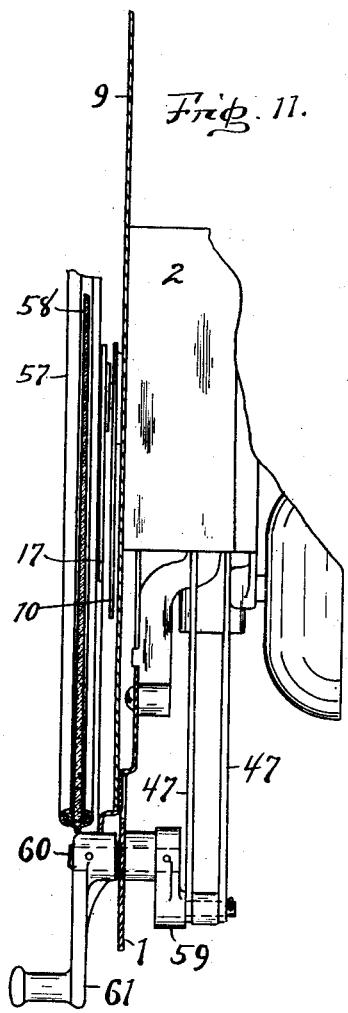

Patented Oct. 19, 1937

2,096,261

UNITED STATES PATENT OFFICE 2,096,261

INDICATOR FOR LIQUID DISPENSING APPARATUS

Byron J. Pepper, Fort Wayne, Ind., assignor to Tokheim Oil Tank and Pump Company, Fort Wayne, Ind., a corporation of Indiana Application July 3, 1933, Serial No. 678,893

5 Claims. (Cl. 235—144)

This invention relates to improvements in indicators for liquid dispensing apparatus.

An object of the invention is to provide automatically-operated mechanism for indicating, in units of measurement and fractional parts thereof, the quantity of liquid as it is delivered by the dispensing apparatus. Another feature is the provision of a manually-operated device for conveniently resetting the pointers on the indicating mechanism back to the zero or starting point. A further object is to afford means, operable by the liquid meter or other measuring mechanism of the dispensing apparatus, for positively actuating the pointers of the indicating mechanism. And a still further object is to afford in conjunction with a primary indicator a secondary indicator with operating shafts connected with corresponding shafts of the primary indicator to be actuated thereby, and so related that binding of the shafts in their bearings or in their couplings and lost motion between the connected shafts is obviated. Other objects and advantages of the invention will appear in the following description:

An illustrative embodiment of the invention is shown in the accompanying drawings in which:

Fig. 2 is a fragmentary side elevation of the structure shown in Fig. 1, portions being broken away;

Fig. 3 is a vertical section of the indicating mechanism;

Figure 1:
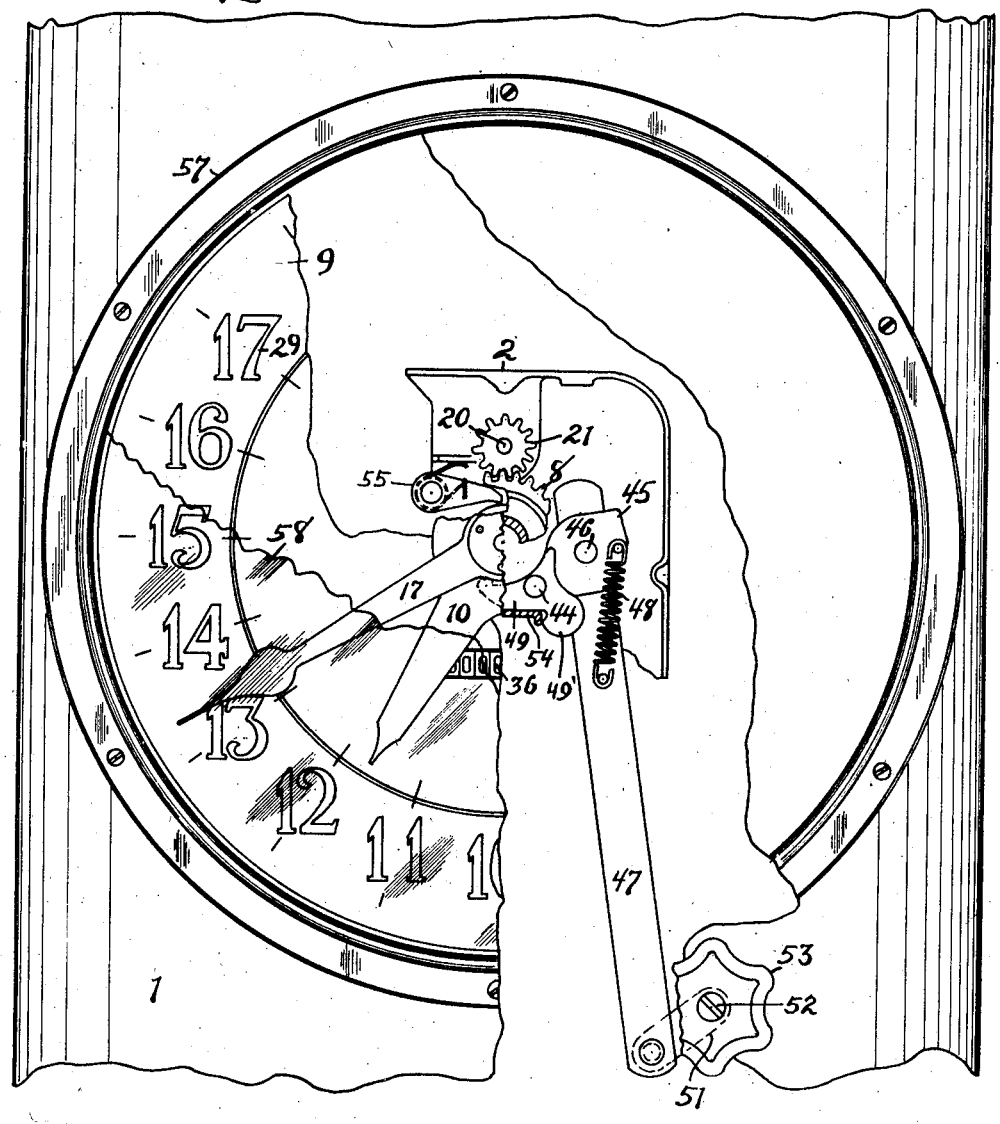
Fig. 1 is a fragmentary front elevation of a dispensing apparatus provided with an indicator in which the invention is embodied, portions being broken away.
Figure 5:
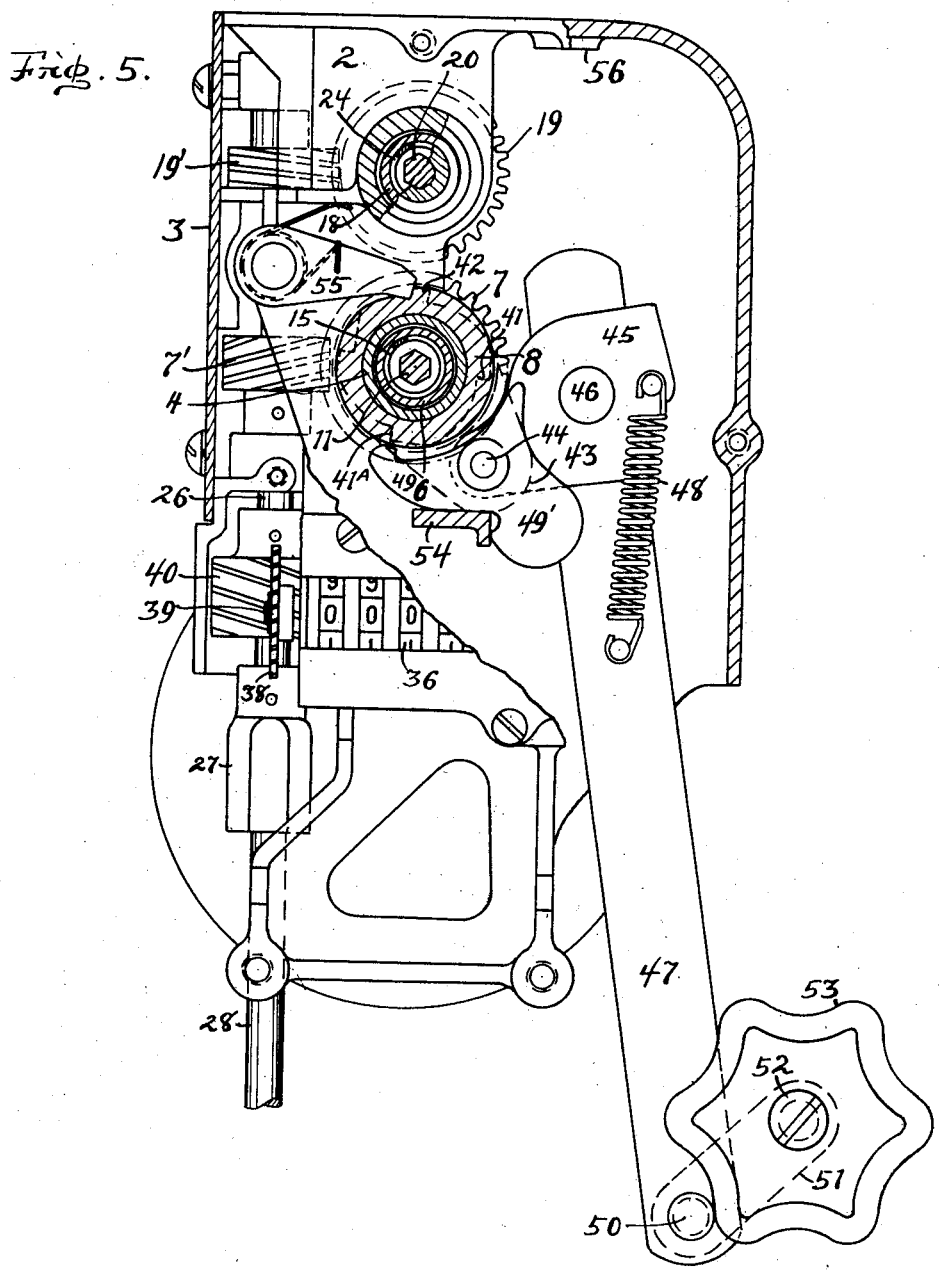

Fig. 3—A is a detail front view of an adapter for mounting one of the indicating pointers on the mechanism;

Fig. 3—B is a detail view of a part in the mechanism shown in Fig. 3;

Fig. 3—C is another detail view of another part shown in Fig. 3;

Fig. 4 is a detail view showing a front face view of a notched wheel forming part of the structure;

Fig. 5 is a side view of the operating mechanism for the indicator, portions being broken away and the parts as disposed in starting position;

Fig. 6 is a fragmentary view of the resetting mechanism with the actuating pawl in engaging position;

Fig. 7 is a similar view of the resetting mechanism showing the parts as disposed at an intermediate point of operation;

Fig. 8 is another similar view of the resetting mechanism with the parts disposed at the stop period of operation;

Fig. 9 is a detail view showing an elevation of the gear mechanism by which the pointers of the indicator are actuated;

Fig. 10 is a fragmentary front elevation of a dispensing apparatus showing a modified form of the resetting device, portions being broken away; and Fig. 11 is a fragmentary elevation projected from Fig. 10, parts being in section.

The illustrative embodiment of the invention consists of mechanism applicable to a liquid dispenser (not shown) such as ordinarily is used for delivering gasoline in measured quantities, and includes a counter for automatically indicating the units of measurement and fractions thereof as delivery from the dispenser progresses; an integrating register operably associated with the counter; and a manually-operated back-set mechanism for the counter, all of which are preferably encased in the dispenser housing 1.

The counter

The mechanism of the counter is provided with a primary frame 2 and secondary frame 2' oppositely disposed, said frames being held spaced apart by a connecting plate 3. The frame 2 has members 4 and 5 in which is journaled the hub 6 of a drive gear 7. The member 4 consists of a stationary sleeve upon which is journaled a follow gear 8 the hub of which extends through a dial 9 on the front of the frame 2 and has secured thereon a unit-indicating pointer 10 that rotates in front of the dial upon rotation of the gear 8.

A drive shaft 11 is disposed axially in the gear 7 and is provided at its outer end with a head 12 which is firmly secured thereon and the hub of which extends loosely through the unit pointer 10 into the adjacent end of the hub 6 of the gear 7 in which it has relative turning movement. The opposite end of the drive shaft 11 extends loosely through the rear end of the hub 6 and has secured thereon a notched wheel 13. Upon the drive shaft 11 within the hub 6 of the gear 7 are disposed a friction collar 14 and a compression spring 15, the spring being compressed between the hub of the head 12 and the friction collar so that said friction collar is constantly pressed against a shoulder 16 in the rear end of the hub 6 and the hub is correspondingly pressed against the notched wheel 13. By this arrangement rotary movement is imparted to the drive shaft 11 as the drive gear 7 is actuated, and back-turning movement of the drive shaft relative to the hub 6, opposed by frictional restraint, is permitted.

Upon the outer end of the head 12 is secured a fraction indicating pointer 17 that rotates in front of the unit indicating pointer 10 and the dial upon rotation of the drive shaft 11. As the gear 7 is rotated corresponding movement is imparted to the drive shaft 11 through the medium of the spring-compressed collar 14.

In the frame 2 is journaled the hub 18 of a second drive gear 19 in which is axially disposed a second drive shaft 20 that has firmly secured upon its forward end a pinion 21 the hub of which extends into the adjacent end of the hub on the drive gear 19 and in which it has relative turning movement. The opposite end of the drive shaft 20 extends loosely through the rear end of the hub 18 and has secured thereon a collar 22. Upon said drive shaft 20, within the hub 18, of the gear 19 are disposed a friction collar 23 and a compression spring 24, the spring being compressed between the hub on the pinion 21 and said friction collar 23 so that said collar is constantly pressed against a shoulder 25 in the rear end of the hub 18. The pinion 21 meshes with the gear 8 so that upon rotation of the drive shaft 20 the gear 8 is actuated and the unit pointer rotated accordingly. As the drive gear 19 is rotated corresponding movement is imparted to the drive shaft 20 through the medium of the spring-pressed friction collar 23.

The drive gears 7 and 19 are individually actuated by corresponding worm wheels 7' and 19' that are secured upon a rotatable shaft 26 that is journaled in the frame 2. (Figs. 5 and 9). The lower end of said shaft has a coupling 27 secured thereon for connection with a meter or measuring device of a dispensing apparatus (not shown) as by a stem or connecting rod 28 so that upon rotation thereof by the meter or measuring device the shaft 26 is correspondingly actuated. Thus, movement is imparted to the drive shafts 11 and 20 through the medium of the worm wheels 7' and 19' and the corresponding drive gears 7 and 19. The gear ratios between the respective worm wheels and their complemental gears are such as may be required. As an example, in the present instance the unit pointer 10, upon making one complete revolution thereby indicates a total of twenty units (gallons) of liquid to have been dispensed, while the fractional pointer 17 makes one complete revolution for each one of the units indicated by the other pointer. Accordingly, in such instance the dial 9 is provided with an appropriate annular scale bearing twenty equally spaced indicia 29 as in the usual practice.

In some instances it is desired to provide a secondary dial 9' and complemental unit and fractional pointers 10' and 17' arranged to be viewed from the opposite side of the apparatus with respect to the other dial and its pointers. To make such provision a follow gear 8' is journaled upon a sleeve 4' that projects outwardly from the secondary frame 2'. The hub of said gear extends loosely through the dial 9' and has secured thereon a unit pointer 10' disposed to rotate in front of the dial 9' upon rotation of said gear. A pinion 21' the hub of which is journaled in the frame 2' meshes with the follow gear 8' and is axially secured to one end of an extension shaft 20'. The opposite end of said shaft extends loosely into the collar 22 and is operatively connected with the drive shaft 20 by means of a universal coupling 30. The particular construction of said coupling is immaterial as any suitable connection between the drive shaft 20 and the extension shaft 20' by which the rotary movement of the drive shaft is imparted to the extension shaft without binding of said shafts in their supports, will serve the purpose. A disc 31 is secured on the extension shaft, and a torsional spring 32 is disposed upon the countershaft with its opposite ends secured respectively to the disc 31 and the collar 22 which serves to take up angular lost motion in the coupling 30. Upon rotation of the drive shaft 20 corresponding movement is imparted to the unit pointer 10' through the medium of the extension shaft 20', pinion 21' and the follow gear 8.

A head 12' is disposed with its hub journaled in the sleeve 4', and has secured upon its outer end a fractional pointer 17' that rotates in front of the unit pointer 10' and the dial 9' upon rotation of said head. The said head has secured axially therein a second extension shaft 11', and the opposite end of said shaft extends loosely into the collar 13 and is operatively connected with the drive shaft 11 by means of an universal coupling 33 similar to the previously mentioned coupling 30 and by which rotary movement of the drive shaft 11 is imparted to said extension shaft 11'. A disc 34 is secured on the extension shaft 11' and a torsional spring 35 is disposed upon said countershaft with its opposite ends secured respectively to said disc and the collar 13 which serves to take up annular lost motion in said coupling 33. Upon rotation of the drive shaft 11 corresponding movement is imparted to the fractional pointer 17' through the medium of the extension shaft 11' and said head 12'.

The unit pointer 10' is held in place on the flanged hub of the follow gear 8' by means of a U-shaped plate 8" provided with screws 10" which permits the unit pointer 10' to be adjusted to a position corresponding with that of the unit pointer 10. Thus, after proper adjustment, as the pointers progress the indications on the one dial correspond precisely with those on the other dial.

Integrating register

A registering device 36 of ordinary construction is mounted in the frame 2, and a suitable sight opening 37 is made in the dial 9 through which the indicating characters on the registering discs may be observed. The registering device is actuated by means of a toothed wheel 38 secured on the stem 39 thereof and which is operatively engaged by a worm 40 secured on the rotatable shaft 26. Thus, when the shaft 26 is rotated forwardly the unit and fractional pointers are progressed and the registering device is actuated correspondingly so that the number of units and fractions thereof indicated by the pointers during successive dispensing operations are shown in an accumulated total amount.

Back-set mechanism

Mechanism is provided for resetting the unit and fractional pointers back to zero or the point of commencement of their indicating operations which is desirable, upon completion or before commencement of each dispensing operation, in order that the precise quantity of liquid delivered during each operation may be readily ascertained.

The resetting mechanism is operatively related with the follow gear 8 and the notched wheel 13.

The gear 8 has a series of ratchet teeth 41—41ᴬ and a stop lug 42, and said wheel has a similar series of ratchet teeth 41ᵇ—41ᶜ and a stop lug 42ᵇ. A pair of swinging arms 43 are mounted in the frame 2 so as to have turning movement about the axial center of the drive shaft 11, and each arm is connected by a pin 44 with a corresponding bracket 45 that is pivotedly supported by means of a stud 46 on an actuating bar 47. Each of said brackets is held in normal position by a tension spring 48 the ends of which are connected respectively with the bracket and the corresponding actuating bar. Also, each bracket 45 has mounted loosely upon its pin 44 a pawl 49 that is operatively engageable with the teeth 41—41ᴬ and lug 42 on the follow gear 8 or the teeth and stop on the wheel 13 accordingly.

The actuating bars 47 are connected at their lower ends by a pivot 50 with an arm 51 that is secured on a shaft 52 disposed in the housing and which is provided with a hand wheel 53. By manually oscillating the shaft 52 the actuating bars 47 are thereby vertically moved to and fro causing the arms 43 to turn about the axis of the drive shaft 11 through the medium of their corresponding brackets 45. Also, the pawls 49 are moved accordingly as the arms are turned whereby back-turning movement of the follow gear 8 and notched wheel 13 is accomplished through engagement of the pawls 49 respectively therewith. The upper end portions of the bars 47 are held apart by a suitable spacer 44' that projects from one of the pins 44 and abuts the corresponding pin on the adjacent bar. The bars 47 are held from spreading by the frame members 2 and 5 with which they respectively have sliding contact.

Each pawl 49 has a weighted extension 49' which causes it to tilt into engaging position when its arm 43 is swung upwardly. However, when said arm is swung to its lowermost position, the pawl 49 is brought into contact with a crosspiece 54 in the frame 2 and is thereby tilted out of its engaging position (Fig. 5).

Spring-pressed pawls 55 are disposed in the frame so as to have engagement respectively with the lug 42 on the follow gear 8 and lug 42ᵇ on the wheel 13 upon backward rotation thereof and thus limit the backward rotation at a definite point. The lugs 42—42ᵇ are so located on said gear and wheel that backward turning movement thereof is stopped by the corresponding pawls when the respective pointers are returned to the zero or starting point on the dial. The series of ratchet teeth 41 and 41ᴬ and the lug 42 on the follow gear 8 and the teeth 41ᵇ—41ᶜ and lug 42ᵇ on the wheel 13 are so spaced that when said lugs are engaged by their pawls 55 at stop position, and the arms 43 are moved back to their lowermost position, the pawls 49 are then out of registry with the corresponding adjacent teeth 41ᴬ or 41ᶜ (as in Fig. 5) and are therefore inoperative.

The actuating bars 47 are reciprocated in unison upon manipulation of the arm 51, their upstrokes being limited by contact with a stop 56 in the frame 2. The brackets 45 tilt respectively upon their studs 46 under restraint of their springs 48 during the latter portion of the upstrokes of the bars 47 if and only when the corresponding members 8 and 13 are stopped by their own pawls 55. The forward strokes of the pawls are accordingly blocked after the corresponding members reach stop position whereupon the pawls, and not until then, become inoperative. Thus, after one of the members (8 or 13) reaches its stop position, upon further action of the bars 47 the other member is progressed until it also reaches stop position so that the pointers are both finally positioned at the starting point.

In Figs. 10 and 11 is shown a modified form of the manually-operated mechanism for resetting the pointers. In this form the actuating bars 47 are connected at their lower ends with a crank 59 that is secured upon a shaft 60 mounted in the housing 1, and a hand-operated crank 61 is secured on the outer end of said shaft by which the shaft is rotated to cause reciprocation of the actuating bars 47. In this instance, the throw of the crank 59 is sufficient to apply to said bars upon rotation of the shaft 60 endwise movement that insures back turning of the follow gear 8 and the notched wheel 13 to their starting points where stopped by the pawls 55.

*Operation*

In practice, the shaft 26 is rotated by movement imparted thereto by the stem or connection 28 that is actuated by the meter or other measuring appliance that is progressed more or less according to the amount of liquid delivered through the dispensing apparatus (not shown). As the shaft 26 is revolved the gears 7 and 19 are thereby turned upon their axes respectively through the medium of the worm wheels 7' and 19' on said shaft. Upon rotation of the gears 7 and 19 like movement is imparted to the complemental drive shafts 11 and 20 through the medium of the spring-pressed friction collars 14 and 23. Thus, the fractional pointers 17 and 17' are rotated directly upon turning of the shaft 11, and the unit pointers 10 and 10' are rotated upon turning of the drive shaft 20. Also, as the shaft 26 is rotated the integrating register 36 is progressed through the medium of the gear 38 and the worm wheel 40. Thus, as liquid is delivered through the dispensing apparatus the quantity thereof is indicated in units of measurement and fractions thereof by the pointers on the dials, and is also shown by the register, and in this manner both the operator and the patron is apprised of the quantity of liquid delivered during each instant dispensing operation, and the summation of quantities delivered in a series of dispensing operations.

It is desirable that individual patrons are apprised of the quantity of fuel delivered to them as served. For this purpose the provision is made to reset the pointers back to zero or the point of commencement of their indicating operations before delivery. This is accomplished by manipulating the handle of the resetting mechanism.

I claim:—

1. In an indicator having unit and fractional pointers and corresponding rotatable shafts and connected means to operate same, a setback mechanism including a member on each of said shafts rotatable therewith and each having a series of notches and a stop lug, stop pawls disposed to engage said lugs respectively to limit backturning movement of the corresponding members at definite points, actuating bars including means for manually operating same simultaneously and provided respectively with a pivoted spring-restrained bracket, each having an actuating pawl operatively engageable with the notches and stop lug of the corresponding member, and a stationary stop to limit the actuating stroke of said bars.

2. In an indicator having unit and fractional pointers and corresponding rotatable shafts and connected means to operate same, a setback mechanism including a member on each of said shafts rotatable therewith and each having a series of notches and a lug, stop pawls disposed to engage said lugs respectively to limit backturning movement of the corresponding members, actuating bars including means for manually operating same simultaneously and provided respectively with a pivoted spring-restrained bracket, each having an actuating pawl operably engageable with the corresponding one of said members, a stationary stop to limit the actuating stroke of said bars, and a cross-piece disposed to interrupt engagement of said actuating pawls with said members and limit the opposite stroke of said bars.

3. In an indicator having unit and fractional pointers and corresponding rotatable shafts and connected means to operate same, a setback mechanism including a member on each of said shafts rotatable therewith and each having a series of notches and a lug, stop pawls disposed to engage said lugs respectively to limit backturning movement of the corresponding members, actuating bars including means for manually operating same simultaneously and provided respectively with a pivoted spring-restrained bracket, each having an actuating pawl operably engageable with the corresponding one of said members, and stationary means to limit the stroke of said bars in each direction.

4. In an indicator having unit and fractional pointers and corresponding rotatable shafts and connected means to operate same, a setback mechanism including a member on each of said shafts rotatable therewith, stop pawls disposed to have engagement respectively with said members to definitely limit backturning movement thereof, actuating bars including means for manually operating same simultaneously and provided respectively with a spring-restrained movable bracket having an actuating pawl operably engageable with the corresponding one of said members, a stationary stop to limit the actuating stroke of said bars, and means engageable with said actuating pawls to move same into inoperative position upon completion of the return stroke of said bars.

5. In an indicator having rotatable connected means to operate same in one direction, a setback mechanism including a member movable with said rotatable means, a stop pawl disposed to engage and limit backturning movement of said member at a definite point, an actuating bar having means connected therewith for manually operating same, said bar being provided with a pivoted spring-restrained bracket having an actuating pawl operably engageable with said member, a stop to limit the actuating stroke of said bar, and means engageable with said actuating pawl to move same into inoperative position upon completion of the return stroke of said bar.

BYRON J. PEPPER.